United States Patent [19]

Power et al.

[11] Patent Number: 5,412,062

[45] Date of Patent: May 2, 1995

[54] THERMALLY DEPOLYMERISABLE POLYOXALATE OR POLYMALONATE POLYMERS CONTAINING HYDROCARBON GROUPS WITH 6-30 CARBON ATOMS AND A TERTIARY CARBON ATOMS ATTACHED TO BRIDGING OXYGEN ATOM

[75] Inventors: Gerald A. Power, Levenshulme; Alison M. Wagland, Oxford, both of United Kingdom; Andrew C. Mackie, Madison, N.J.

[73] Assignee: Cookson Group plc, London, England

[21] Appl. No.: 199,302

[22] PCT Filed: Aug. 28, 1992

[86] PCT No.: PCT/GB92/01573

§ 371 Date: May 19, 1994

§ 102(e) Date: May 19, 1994

[87] PCT Pub. No.: WO93/05093

PCT Pub. Date: Mar. 18, 1993

[30] Foreign Application Priority Data

Sep. 9, 1991 [GB] United Kingdom ............... 9119247

[51] Int. Cl.$^6$ ............................................. C08G 63/02
[52] U.S. Cl. .................................... 528/272; 528/176; 528/193; 528/194
[58] Field of Search ................ 528/176, 272, 194, 193

[56] References Cited

U.S. PATENT DOCUMENTS

| | | | |
|---|---|---|---|
| 3,043,808 | 7/1962 | Hagemeyer | 528/286 |
| 3,169,121 | 2/1965 | Goldberg | 528/196 |
| 4,343,912 | 8/1982 | Lim | 521/90 |
| 4,446,271 | 5/1984 | Heater | 521/441 |
| 5,114,983 | 5/1992 | Stahlke et al. | 521/95 |
| 5,126,380 | 6/1992 | Stahlke et al. | 521/138 |

*Primary Examiner*—John Kight, III
*Assistant Examiner*—Terressa M. Mosley
*Attorney, Agent, or Firm*—Watson, Cole, Grindle & Watson

[57] ABSTRACT

Thermally depolymerizable polyoxalate and polymalonate polymers which contain hydrocarbon groups having from 6 to 30 carbon atoms and a tertiary carbon atom attached to at least one of the bridging oxygen atoms in the structure are usable as binders for powdered glass ceramic or metallic materials, and as rheological control agents in paste formulations.

18 Claims, No Drawings

THERMALLY DEPOLYMERISABLE POLYOXALATE OR POLYMALONATE POLYMERS CONTAINING HYDROCARBON GROUPS WITH 6-30 CARBON ATOMS AND A TERTIARY CARBON ATOMS ATTACHED TO BRIDGING OXYGEN ATOM

BACKGROUND OF THE INVENTION

The present invention relates to novel polymers and their use in a variety of binder systems and, in particular, to the use of a novel thermally depolymerisable polyoxalate or polymalonate polymer as a binder for powdered glass, ceramic or metallic materials, and as a rheological control agent in paste formulations.

Thermally depolymerisable polycarbonates have been described by F. M. Houlihan, F. Bouchard, J. M. J. Frechet and G. G. Wilson in Macromolecules 1986, 19, 13–19. The materials which are described are polycarbonates containing a tertiary group next to the main chain oxygen which were prepared by using a solid-liquid phase-transfer-catalyzed polycondensation of the bis(carbonylimidazolide) of 2,5-dimethyl-2,5-hexanediol with various other diols in the presence of powdered potassium carbonate. These polycarbonates decompose cleanly upon heating to about 220° C. with liberation of volatile materials, leaving no solid residue.

In EP-0463796A we have described compositions in which at least one powdered material is admixed with at least one thermally depolymerisable polycarbonate containing the repeating units

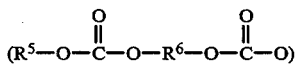

where $R^5$ and $R^6$ are the same or different and each independently represents a hydrocarbon group containing from 4 to 30 carbon atoms, the said group having a tertiary carbon atom, an allylic, propargylic or benzylic group attached directly to at least one oxygen atom.

SUMMARY OF THE INVENTION

We have now surprisingly found that certain novel thermally depolymerisable polyoxalates and polymalonates can be used as binders for a variety of powdered materials, and as rheological control agents in paste formulations. Furthermore, these materials depolymerise on heating to liberate volatile molecules. This process does not require the presence of oxygen and can be processed in an inert atmosphere such as nitrogen.

In one aspect the present invention provides a polymer or copolymer containing repeating groups of the formula

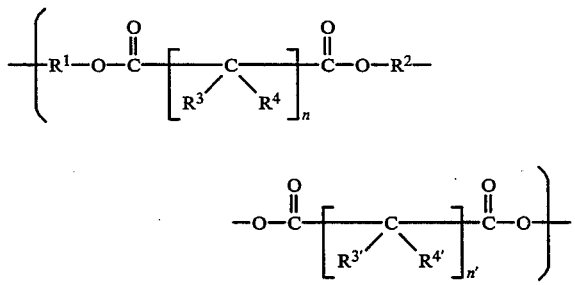

where $R^1$ and $R^2$ are each independently a hydrocarbon group containing from 3 to 30 carbon atoms which has a tertiary carbon atom attached to at least one of the bridging oxygen atoms, $R^3$, $R^{3'}$ $R^4$, $R^{4'}$ are each independently a hydrogen atom, an alkyl group containing from 1 to 12 carbon atoms, an aryl group, a heterocyclic group or an acyl group containing from 1 to 12 carbon atoms, and n and n' are 0 or 1.

When n and n' are 0 the polymers are polyoxalates and when n and n' are 1 the polymers are polymalonates. When n and n' are 1 preferably $R^3$, $R^{3'}$ and $R^4$, $R^{4'}$ are both hydrogen atoms, or one of $R^3$, $R^{3'}$ and $R^4$, $R^{4'}$ is a hydrogen atom and the other is an acyl group containing from 1 to 12 carbon atoms, and most preferably, when n and n' are 1, $R^3$, $R^{3'}$ and $R^4$, $R^{4'}$ are hydrogen atoms.

The present invention also includes within its scope polymers in which one of n and n' is 0 and the other of n and n' is 1, i.e. copolymers of oxalate/malonate.

The present invention furthermore includes a copolymer which comprises groups of the formula

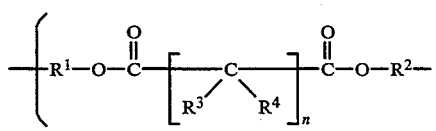

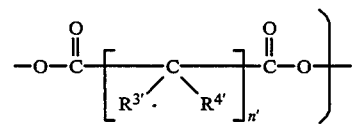

where $R^1$, $R^2$, $R^3$, $R^{3'}$, $R^4$, $R^{4'}$ n and n' are each as defined above and groups of the formula

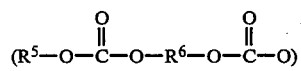

where $R^5$ and $R^6$ each independently represents a hydrocarbon group containing from 4 to 30 carbon atoms, the said group having a tertiary carbon atom, an allylic, propargylic or benzylic group attached directly to at least one oxygen atom, i.e. copolymers of oxalate/carbonate or malonate/carbonate.

The novel polymers of the present invention may be produced by the condensation reaction between a diol, or a mixture of diols and an oxalyl and/or malonyl moiety, such as an acid chloride, acid or ester.

The diols which may be used in the preparation of the novel polymers of the invention have the general formula:

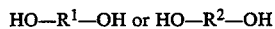

where $R^1$ and $R^2$ are as defined above.

The novel polymers of the present invention owe their thermal lability to the structure of the diols which are used in their preparation, as a result of the diols possessing a tertiary carbon atom bonded to at least one of the hydroxyl functional groups in the diol.

Examples of diols which may be used are 2,5-dimethylhexane-2,5-diol, 3,6-dimethyl-4-octyne-3,6-diol and 2,3-dimethylbutanediol, or mixtures thereof.

The thermally depolymerisable polyoxalates and polymalonates of the invention may be used, in accordance with the present invention, as binders for a wide range of powdered materials such as powdered glass, powdered plastics, or similar organic materials, powdered ceramic materials or powdered or otherwise comminuted metals or alloys, or mixtures thereof. The amount of the powdered material which is mixed with the binder along with other materials such as solvents will depend upon the intended end use of the composition so formed. For example, if the polyoxalate or polymalonate is to be used in a paste system, such as a solder paste, glass paste or a hybrid thick film or similar electrical paste such as indium tin oxide paste, the quantity of powdered material in the composition will generally be in the range of from 50 to 99.9% by weight based on the total dry weight of the composition depending on the bulk density of the solids, and the specific gravity of both solids and liquids. However, when the thermally depolymerisable polyoxalate or polymalonate is used as a binder/pressing aid for a powdered ceramic material the powdered ceramic material will generally be present in the composition in an amount of from 80 to 99.999% by weight based on the total weight of the composition, and preferably less than 90% by weight.

The thermally depolymerisable polyoxalate or polymalonate used in the present invention may be used in combination with other binders, such as polycarbonates for example as described in EP-0463796A, ethyl cellulose or derivatives thereof in relatively small amounts. The use of other binders, in combination with the thermally depolymerisable polyoxalate or polymalonate, may be beneficial in controlling the rheological or other properties of the mixture.

It will be appreciated that for some applications it will be necessary to dissolve the thermally depolymerisable polymer in a solvent, or a mixture of solvents, the choice of which is dependent on the application and the chemical nature of the solvent. Volatile solvents such as chloroform or 1,4-dioxane may be used when the function of the polyoxalates and polymalonates is to act as a pressing aid/binder. In the case of electronic pastes for screen printing etc., a solvent of low volatility for example α-terpineol or a glycol ether or a derivative thereof, such as diethyleneglycol monobutyl ether acetate is preferred.

The thermally depolymerisable polyoxalates or polymalonates used as binders in the present invention generally decompose at a temperature of below 400° C., preferably at a temperature in the range of 150° to 250° C. Thus, when used as a binder for a solder paste the polymer will decompose during the heating of the pastes, thereby leaving minimal residues. When the thermally depolymerisable polyoxalate or polymalonate is used as a binder/pressing aid for a ceramic powder material, the polymer will depolymerise at a temperature in the range of from 150° to 250° C., even in an inert, non oxygen containing atmosphere, or a reduced oxygen atmosphere. This is in contrast to many binders which have to be burnt out in an oxygen atmosphere and is particularly important in respect of ceramic materials such as $Si_3N_4$ which should be processed in an inert atmosphere, e.g. under a nitrogen blanket. Similarly, such a characteristic is also particularly desirable in the processing of nitrogen fired hybrid thick film pastes such as described in U.S. Pat. Nos. 4,594,181, 4,600,604, 4,597,897, 4,654,166 and 4,537,703.

It will be appreciated by those skilled in the art that it may be advantageous to use a mixture of thermally depolymerisable polyoxalates and/or polymalonates and/or polycarbonates as the binder in the compositions of the invention. The use of such a mixture will provide the ability to vary the rheological properties of the binder or vehicle, the depolymerisation temperature, the depolymerisation rate, etc.

The present invention includes within its scope the use of a thermally depolymerisable polyoxalate or polymalonate both as a binder for a powdered material, and as a rheological control agent in paste formulations.

The thermally depolymerisable polyoxalates and polymalonates of the present invention may also be used as protective coatings for metals and other materials, as blowing agents for polyurethane or similar foams, and as functional elements in thermally sensitive devices.

The present invention will be further described with reference to the following non-limiting Examples in which parts and percentages are by weight, unless otherwise stated.

In the following Examples a detailed description of the preparation of thermally depolymerisable polymers of the invention is provided and some examples of their application given.

EXAMPLE 1

Oxalyl chloride (12.7 g, 0.1 mole) was weighed accurately into a dry flask followed by anhydrous dichloromethane (50 ml) under an atmosphere of nitrogen. An exact equivalent amount of the chosen diol (or diols for a copolymer) was weighed into a reaction vessel equipped with a pressure equalising dropping funnel, a reflux condenser, a magnetic stirrer bar, and a nitrogen inlet and outlet. Pyridine (1.1 equivalents) in dichloromethane (120 ml) was added and the mixture stirred until dissolved. Oxalyl chloride in dichloromethane was added to the solution at 0° C. via the pressure equalising funnel. Once the addition was complete the reaction was allowed to stir at this temperature for 2 hours. The reacted mixture was then allowed to warm up to room temperature, dichloromethane (150 ml) was added and the precipitated pyridinium hydrochloride removed by filtration. The organic phase was washed with water (3×300 ml), dried ($MgSO_4$) and solvent removed in vacuo to yield the polymer.

Characterization of Polymers

The polymers were purified by precipitation into methanol. The infrared spectra were recorded on a Perkin Elmer 457 as Nujol mulls. $^1$Hnmr spectra were recorded on Joel JNM-PMX 60Si, at 60 MHz, using $Me_4Si$ as the internal standard. All the nmr data were relative to this standard in parts per million. Molecular weight determinations were performed by comparison with polystyrene standards using a gel permeation chromatography system comprising a Knauer auto sampler and pump, columns from Polymer Laboratory and GPC Pro software. The mobile phase was chloroform.

EXAMPLE 2

2,5-Dimethylhexane-2,5-diol was used as the diol in the general procedure of Example 1. The polymer was isolated as a white powder.

$^1$Hnmr δ($CDCl_3$, 60 Hz) 1.60 (s, $CH_3$, 12 H) and 1.92 (s, —$CH_2$—, 4 H)

Ir $V_{max}$ (Nujol mull) 1725, 1745 and 1450 $cm^{-1}$

GPC $Mn = 17000$ and $Mw = 38000$

CHN analysis - Calcd (%) C=62.72 and H=8.6
Found (%) C=62.52 and H=8.03

EXAMPLE 3

2,3-Dimethylbutane-2,3-diol was used as the diol in the general procedure of Example 1. The polymer was isolated as a white powder $^1$Hnmr δ(CDCl$_3$,60 MHz) 1.60 (s, 12 H)
Ir V$_{max}$ (Nujol mull) 1755, 1735 and 1450 cm$^{-1}$
GPC Mn=2400 and Mw=4100.

EXAMPLE 4

3,6-Dimethyl-4-octyne-3,6-diol was used as the diol in the general procedure of Example 1. The polymer was obtained as a waxy solid.

$^1$Hnmr δ(CDCl$_3$,60 MHz) 1.04 (t, CH$_2$—C $_3$,6 H); 1.56 (s,CH$_3$,6 H) and 1.82 (m,C $_2$—CH$_3$,4 H).
Ir V$_{max}$ (Nujol mull) 1750, 1725 and 1450 cm$^{-1}$
GPC Mn=2500 and Mw=4300.

EXAMPLE 5

3,6-Dimethyl-4-octyne-3,6-diol and 2,3-dimethylbutane-2,3-diol in the ratio 1:9 were used in the general procedure of Example 1. The copolymer was a white solid.

$^1$Hnmr δ(CDCl$_3$,60 MHz) 1.04 (t,CH$_2$—CH$_3$); 1.60 (s,CH$_3$) and 1.82 (m,CH$_2$—CH$_3$).
Ir V$_{max}$ (Nujol mull) 1750, 1725 and 1450 cm$^{-1}$
GPC Mn=2100 and Mw=2140.

EXAMPLE 6

2,3-Dimethylbutane-2,3-diol and 3,6-dimethyl-4-octyne-3,6-diol (1:1) were used as the diols in the general procedure of Example 1. The copolymer was obtained as a white solid.

$^1$Hnmr δ(CDCl$_3$,60 MHz) 1.04 (t,CH$_2$—CH$_3$,6 H); 1.60 (s,CH$_3$,18 H); and 1.80 (m,CH$_2$—CH$_3$,4 H).
Ir V$_{max}$ (Nujol mull) 1750, 1725 and 1450 cm$^{-1}$
GPC Mn=2100 and Mw=2400.

EXAMPLE 7

2,4-Dimethylpentane-2,4-diol was used as a diol in the general procedure of Example 1. The polymer was obtained as a white solid.

$^1$Hnmr δ(CDCl$_3$,60 MHz) 1.64 (t,CH$_3$,12 H); 2.26 (m,CH$_2$,2 H).
Ir V$_{max}$ (Nujol mull) 1750, 1725 and 1450 cm$^{-1}$
GPC Mn=1600 and Mw=2900.

EXAMPLE 8

2,5-Dimethylhexane-2,5-diol 2,3-dimethylbutane-2,3-diol (1:1) were used as the diols in the general procedure of Example 1. The copolymer was obtained as a white solid.

$^1$Hnmr δ(CDCl,60 MHz) 1.6 (s,CH$_3$,24 H) and (s,CH$_2$,4 H).
Ir V$_{max}$ (Nujol mull) 1745, 1720 and 1450 cm$^{-1}$.

EXAMPLE 9

2,5-Dimethylhexane-2,5-diol and 2,4-dimethylpentane-2,4-diol (1:1) were used as the diols in the general procedure of Example 1. The copolymer was obtained as a white solid.

$^1$Hnmr δ(CDCl$_3$,60 MHz) 1.56 (s,CH$_3$,24 H) and 1.95 (s,CH$_2$,6 H).
Ir V$_{max}$ (Nujol mull) 1750, 1725 and 1450 cm$^{-1}$.
GPC Mn=10,500 and Mw=21,000.

EXAMPLE 10

Malonyl chloride (14.1 g, 0.1 mole) was weighed accurately into a dry flask followed by anhydrous dichloromethane (50 ml) under an atmosphere of nitrogen. An exact equivalent amount of the chosen diol (or diols for a copolymer) was weighed into a reaction vessel equipped with a pressure equalising funnel as in the general procedure of Example 1. The malonyl chloride in dichloromethane was added dropwise to the solution of the diol at 0° C., under an atmosphere of nitrogen. Pyridine (0.5 equivalents) in dichloromethane (20 ml) was added slowly to the reaction mixture at 0° C. Once the addition was complete, the reaction was stirred at 0° C. for 6 hours and overnight at room temperature. The mixture was diluted with dichloromethane (150 ml) and the pyridinum hydrochloride formed was filtered off. The filtrate was washed with water (3×150 ml), dried (MgSO$_4$) and solvent removed in vacuo to yield the polymer.

EXAMPLE 11

2,5-Dimethylhexane-2,5-diol was used as the diol in the general procedure of Example 10. The polymer was obtained as a white solid.

$^1$Hnmr δ(CDCl$_3$,60 MHz) 1.48 (s,CH$_3$,12 H); 1.84 (s,CH$_2$,4 H) and 3.24 (s,0=C—CH$_2$,2 H).
Ir V$_{max}$ (Nujol mull) 1740 and 1710 cm$^{-1}$.
GPC Mn=2700 and Mw=3700.

EXAMPLE 12

2,5-Dimethylhexane-2,5-diol and 2,3-dimethylbutane-2,3-diol (9:1) were used as the diols in the general procedure of Example 10.

$^1$Hnmr δ(CDCl$_3$60 MHz) 1.48 (s,CH$_3$); 1.90 (s,CH$_2$) and 3.30 (s,0=C—CH$_2$).
Ir V$_{max}$ (Nujol mull) 1710 and 1730 cm$^{-1}$.
GPC Mn=2700 and Mw=3800.

EXAMPLE 13

2,5-Dimethylhexane-2,5-diol and 2,4-dimethylpentane-2,4-diol (9:1) were used as the diols in the general procedure of Example 10.

$^1$Hnmr δ(CDCl$_3$,60 MHz) 1.42 (s,CH$_3$); 1.84 (s,C $_2$,CH$_3$) and 3.2 (0=C—CH$_2$,2 H).
Ir V$_{max}$ (Nujol mull) 1740 and 1710 cm$^{-1}$.
GPC Mn=4100 and Mw=5300.

EXAMPLE 14

2,5-Dimethylhexane-2,5-diol and 2,4-dimethylpentane-2,4-diol (4:1) were used as the diols in the general procedure of Example 10.

$^1$Hnmr δ(CDCl$_3$,60 MHz) 1.44 (s,CH$_3$); 1.82 (s,CH$_2$) and 3.2 (s,0=C—CH$_2$,2 H).
Ir V$_{max}$ (Nujol mull) 1740 and 1710 cm$^{-1}$.
GPC Mn=2600 and Mw=3100.

EXAMPLE 15

The procedure of Example 10 was followed except that dimethylmalonyl dichloride was used. p-Benzenedimethanol was used as the diol.

$^1$Hnmr δ(CDCl$_3$,60 MHz) 1.44 (s,CH$_3$,6 H); 5.20 (s,CH$_2$,4 H) and 7.24 (s, aromatic, 4 H).
Ir V$_{max}$ (Nujol mull) 1715 and 1450 cm$^{-1}$.
GPC Mn=3260 and Mw=4100.

EXAMPLE 16

2,5-dimethyl-2,5-hexanediol (14.62 g, 0.10 mole) was added to a dry flask (250 ml) equipped with a magnetic stirrer bar, reflux condenser, nitrogen inlet and a pressure equalising dropping funnel followed by 1,4-benzene dimethanol (13.82 g. 0.10 mole), 2,5-bis(imidazolyl-1-carbonyloxy)-2,5-dimethylhexane (33.40 g, 0.10 mole), potassium carbonate (2.50 g, 0.18 mole) and 18-crown-6 (0.20 g, 0.76 mmol) under a dry nitrogen atmosphere.

Anhydrous dichloromethane (150 ml) was added and the mixture was stirred for 10 minutes before heating to reflux temperature. After 2 hours anhydrous pyridine (17.40 g, 0.22 mole) was added followed by the dropwise addition of anhydrous oxalyl chloride (50 ml of 2.0 molar solution in dichloromethane, 0.10 mole) via the pressure equalising dropping funnel. The reaction was left to stir overnight. The reaction mixture was filtered to remove the potassium carbonate and the precipitated pyridinium hydrochloride. The filtrate was washed with distilled water (2×200 ml) and 10% aqueous copper sulphate solution (1×100 ml). The organic phase was dried with anhydrous magnesium sulphate (20 g) and concentrated by evaporation. Polymer recovery was finalised by precipitation into cold methanol (600 ml) followed by filtration and drying. The polymer was isolated as a white free flowing powder.

$^1$Hnmr (CDCl$_3$,250 MHz) δ1.43 (s,CH$_3$), 1.51 (s,CH$_3$), 1.80 (s,CH$_2$), 1.89 (s,CH$_2$), 5.07 (s,CH$_2$), 5.29 (s,CH$_2$), 7.38 (m,Ar-H)

$^{13}$Cnmr (CDCl$_3$,250 MHz) δ25.76 (m,CH$_3$), 34.31 (m,CH$_2$), 67.66 (m,CH$_2$), 68.10 (m,CH$_2$), 83.90 (s,C), 86.61 (s,C), 128.86 (m,Ar), 134.87 (s,Ar), 153.26 (s,C=0), 157.35 (s,C=0), 158.19 (s,C=0)

Ir (KBr disc) 3000, 1739 (C=0), 1374, 1289, 1198cm$^{-1}$.

GPC Mn=2300 and Mw=2600.

EXAMPLE 17

Sealing Glass

Nippon Electric Glass LS0113 (average particle size 12.5μ) (12 g) was mixed with 1.5 g of a 1% solution of the polyoxalate of Example 2 in α-terpineol (98%). The resulting paste was spread thinly onto the two halves of a black alumina ceramic chip carrier which were then dried at 180° C. and glazed at 420° C. The resulting "cerdip" package was well adhered.

EXAMPLE 18

Silver-Glass Die Attach

Alpha metal low temperature die attached glass DA3030 (1.2 g) was mixed with Handy and Herman silver flake 282 (8.8 g). A solution of the polyoxalate of Example 2 in α-terpineol (1%,2 g) was added and the resulting paste used to adhere bare backed silicon die to black alumina substrate. The samples were fired for 10 minutes at 350° C. and the die were found to have adhered to the substrate.

EXAMPLE 19

Thick Film Conductor

A batch of glass containing

|  | wt % |
|---|---|
| BiO$_3$ | 81.6 |
| SiO$_2$ | 15.8 |
| PbO | 2.6 | was mixed and melted at 1350° C. in a platinum crucible. The resulting glass was ground and sieved to provide a powder having a particle size of 50% less than 2.7 micrometers as measured on a Malvern Mastersizer. Two pastes were made having the following compositions:

| Metal powder* | 67.2% |
|---|---|
| Glass powder | 11.4% |
| ZnO | 4.2% |
| 6% polyoxalate 1 of Example 2 dissolved in α-terpineol | 17.2% |

*either Ag/Pd 70/30 with a particle size less than 1 μm.

The pastes were printed through a 325 mesh British standard screen onto 96% alumina substrate and dried for 15 minutes at 180° C. They were then fired in air over a cycle comprising a fast ramp to 250° C. followed by a 5 minutes dwell then a ramp of approximately 35° C. per minute to 850° C. After dwell of 10 minutes the samples were cooled at approximately 55° C./minute to room temperature. After firing the samples were tested for conductivity and all were found to give highly conductive films, possessing good adhesion to the substrate.

EXAMPLE 20

Thick Film Resistor

A batch glass comprising:

|  | wt % |
|---|---|
| CaO | 10.5 |
| SiO$_2$ | 40.2 |
| Bi$_2$O$_3$ | 25.8 |
| Al$_2$O$_3$ | 18.9 |
| ZrO$_2$ | 3.8 |
| TiO$_2$ | 0.8 | was melted in a platinum crucible at 1500° C. It was quenched, ground and sieved to a particle size of less than 3.4 μm. A paste was then produced using the polyoxalate solution of Example 19 with 94% of the solids being glass and 6% solids LaB$_6$. The paste was printed, dried and fired as in Example 19 and found to give a well adhered resistive film.

EXAMPLE 21

Thick Film Dielectric

Barium disilicate glass powder (d$_{50}$=3.3μ 65 wt % of the following composition:

|  | wt % |
|---|---|
| BaO | 40.2 |
| SiO$_2$ | 34.8 |
| Al$_2$O$_3$ | 3.1 |
| PbO | 16.2 |
| ZnO | 2.6 |
| B$_2$O$_3$ | 3.1 | was mixed with 35% of the polyoxalate binder as described in Example 19. The paste was printed through a 325 mesh British standard, screen onto 96% white alumina tiles dried and fired using the method of Example 19. The films produced possessed good adhesion to the substrate.

EXAMPLE 22

The following procedure was used to establish the thermal decomposition characteristics of the polymers.

Approximately 50 mg of polymer was placed on an alumina plate at 100° C. and then heated, using a hotplate, to 250° C. Three temperatures were recorded for each polymer; the temperatures at which the material melted ($T_{melt}$), the temperature at which decomposition started (observed by the evolution of gas) ($T_{start}$) and the temperature at which decomposition ended ($T_{end}$). The results are presented in Table 1.

In all cases the polymer sample and alumina plate were weighed accurately on a 4 figure balance before and after decomposition. No measurable residue was left. However in some cases, staining of the alumina plate was observed.

TABLE 1

| Example | $T_{melt}$ °C. | $T_{start}$ °C. | $T_{end}$ °C. |
|---|---|---|---|
| 2 | 150 | 164 | 180 |
| 3 | 120 | 210 | 233 |
| 4 | 90 | 160 | 210 |
| 8 | 110 | 166 | 205 |
| 11 | 110 | 130 | 220 |
| 12 | 90 | 177 | 214 |
| 13 | 90 | 160 | 230 |
| 14 | 110 | 176 | 227 |

EXAMPLE 23

3 g of the polyoxalate as described in Example 2 was dissolved in 10 g of Estasol (Chemoxy International) by heating, with stirring, to 100° C. Upon cooling a paste was formed which was characterised on a Cartimed CSL 500 Rheometer at 20° C. At a shear rate of $100s^{-1}$, the mixture had a viscosity of 900 mPa.s, whereas the pure solvent had a viscosity of 25 mPa.s.

We claim:

1. A polymer or copolymer which contains repeating groups of the formula

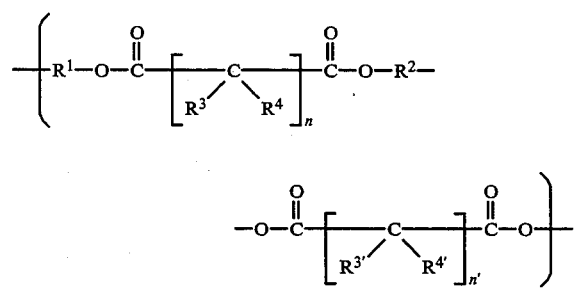

where $R^1$ and $R^2$ are each independently a hydrocarbon group containing from 6 to 30 carbon atoms which has a tertiary carbon atom attached to at least one of the bridging oxygen atoms, $R^3$, $R^{3'}$ and $R^4$, $R^{4'}$ are each independently a hydrogen atom, an alkyl group containing from 1 to 12 carbon atoms, an aryl group, a heterocyclic group or an acyl group containing from 1 to 12 carbon atoms, and n and n' are 0 or 1.

2. A polymer or copolymer as claimed in claim 1 wherein n and n' are 1 and $R^3$, $R^{3'}$ and $R^4$, $R^{4'}$ are both hydrogen atoms, or one of $R^3$ and $R^4$, $R^{3'}$ and $R^{4'}$, is a hydrogen atom and the other is an acyl group containing from 1 to 12 carbon atoms.

3. A copolymer as claimed in claim 1 wherein n and n' are randomly 0 or 1.

4. A copolymer characterized in that it comprises groups of the formula

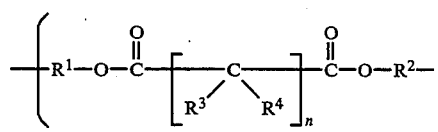

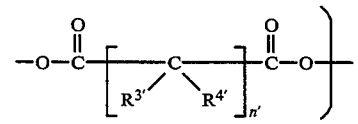

where $R^1$, $R^2$, $R^3$, $R^{3'}$, $R^4$, $R^{4'}$ n and n' are each as defined in claim 1 and groups of the formula

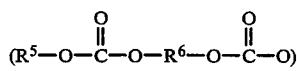

where $R^5$ and $R^6$ each independently represents a hydrocarbon group containing from 4 to 30 carbon atoms, the said group having a tertiary carbon atom, an allylic, propargylic or benzylic group attached directly to at least one oxygen atom.

5. A method for the preparation of a polymer or copolymer as claimed in claim 1 which method comprises the condensation of a diol of the general formula

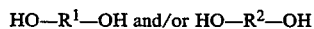

with an oxalyl and/or malonyl moiety characterized in that $R^1$ and $R^2$ are as defined in claim 1.

6. A method as claimed in claim 5 where the oxalyl and/or malonyl moiety is in the form of an acid, acid chloride or ester.

7. A method as claimed in claim 5 wherein the diol is 2,5-dimethylhexane-2,5-diol, 3,6-dimethyl-4-octyne-3,6-diol or 2,3-dimethylbutanediol or mixtures thereof.

8. A composition which comprises at least one powdered or otherwise comminuted material admixed with at least one polymer or copolymer, or a solution thereof in a suitable solvent, characterized in that the polymer or copolymer is a thermally depolymerisable polymer as claimed claim 1.

9. A composition as claimed in claim 8 wherein the powdered material is a powdered glass, powdered ceramic material, powdered plastic or other similar organic material, or powdered metal or alloy, or a mixture thereof.

10. A composition as claimed in claim 9 wherein the powdered material is powdered glass or ceramic, or powdered, flaked or otherwise comminuted metal or alloy, or a mixture thereof, which is present in an amount of from 50 to 99.999% by weight based on the total weight of the composition.

11. A composition as claimed in claim 9 wherein the powdered material is a powdered ceramic material which is present in an amount of from 95 to 99.5% by weight based on the total weight of the composition.

12. A composition as claimed in claim 8 wherein a mixture of thermally depolymerisable polymers is used.

13. A composition as claimed in claim 8 wherein the thermally depolymerisable polymer, or a mixture thereof, is dissolved in a solvent or a mixture of solvents.

14. A composition as claimed in claim 13 wherein the solvent for electronic paste applications is a glycol ether or a derivative thereof.

15. A solder paste, glass paste or hybrid thick film paste which comprises as a rheological control agent and/or binder a thermally depolymerisable polymer or copolymer as claimed in claim 1.

16. A protective coating for a metal or other material which comprises a thermally depolymerisable polymer or copolymer as claimed in claim 1.

17. A blowing agent for a polyurethane or similar polymeric foam which comprises a thermally depolymerisable polymer or copolymer as claimed in claim 1.

18. A thermally sensitive device which comprises a thermally depolymerisable polymer or copolymer as claimed in claim 1.

* * * * *